June 10, 1952 — W. D. TEAGUE, JR — 2,600,137

PRESSURE-REGULATING VALVE

Filed Dec. 26, 1947

INVENTOR
WALTER D. TEAGUE, JR.
BY Frederic H. Miller
ATTORNEY

Patented June 10, 1952

2,600,137

UNITED STATES PATENT OFFICE 2,600,137

PRESSURE-REGULATING VALVE

Walter D. Teague, Jr., Alpine, N. J., assignor to Bendix Aviation Corporation, Teterboro, N. J., a corporation of Delaware Application December 26, 1947, Serial No. 793,968

11 Claims. (Cl. 50—35)

The present invention relates to valves and particularly to valves of the throttling or pressure regulating type.

Among the objects of the invention are to improve the accuracy and reduce the manufacturing costs of pressure regulating valves.

Another object, in combination with a cylinder and a piston or valve guide means, is to provide a novel piston or valve structure having more effective cooperation between the guide and the cylinder.

Other objects are to provide a valve which reduces leakage, compensates for discrepancies of dimensions and avoids the necessity for having close tolerances between its parts, and has novel spring tension adjusting means.

Another object is to provide a novel multi-stage pressure regulating unit, as by a plurality of single-stage valves designed for coupling together as components of the unit.

Another object is to provide a regulating valve which is simple and durable in construction, and effective in its operation.

The above and other objects and features of the invention will appear more fully hereinafter from a consideration of the following description taken in connection with the accompanying drawing wherein two embodiments of the invention are illustrated by way of example.

The term "pressure" is employed herein to mean either super-atmospheric pressure or sub-atmospheric pressure, except as specifically mentioned as one of such pressures.

In the drawing.

Corresponding parts are designated by corresponding reference characters in each of the figures.

Figure 1:
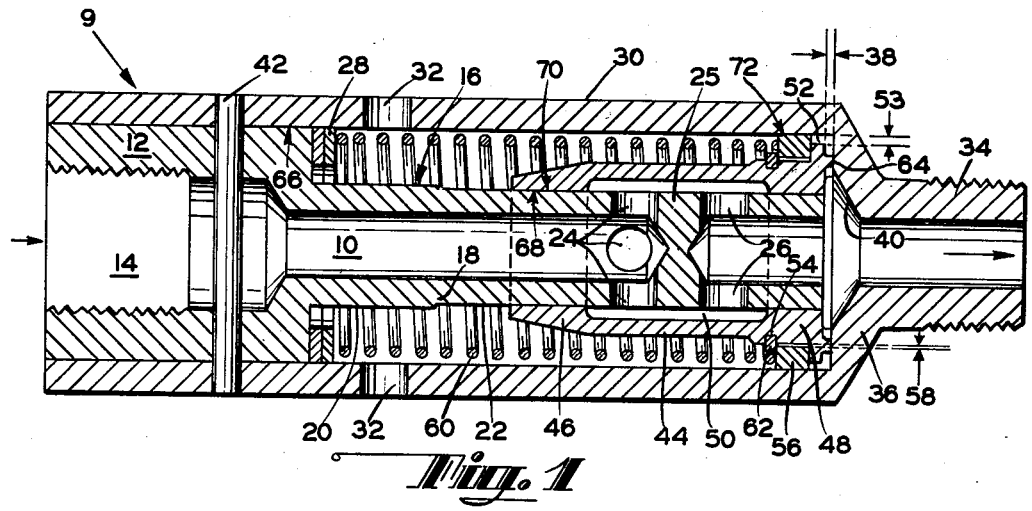
Figure 1 is a side view in section of a super-pressure regulating valve constructed in accordance with the invention.

In Figure 1, a valve 9 constituting one example and combination of the invention comprises a tubular inner guide 10 including a body 12 having an internally screw threaded system inlet end 14, and an opposite-end extension 16 of less diameter than the body 12 having an intermediate shoulder 18 defining inner and outer extension lengths 20 and 22, respectively, the outer length 22 having axially offset side ports 24 and 26, respectively, a partition 25 between the ports 24 and 26, and annular gasket-like shim means 28 surrounding the extension 16 next to the body 12.

A tubular housing 30, having vent holes 32 and telescoping the body 12 in tight-fitting relation thereto, is adapted for connection to an instrument, such as a turn-and-bank indicator, for which it includes a system-outlet tube-receiving end 34 having a wall element 36 transversely of the guide 10 spaced axially beyond the outer extension length 22, by the distance of a gap 38, and having a tapered outwardly converging counterbore 40. Means, in this instance a reamthrough press-in pin 42, interconnects the body 12 and the housing 30 across the inlet 14.

The ends 14 and 34 are adapted to directly receive tube or conduits of a system where the valve is employed singly. The ends 14 and 34 are also complemental to the ends 34 and 14, respectively, of other similar valves for purposes of the unit of Figure 3, as will further appear.

A valve sleeve element 44 comprises, in this instance, opposite-end bearings 46 and 48, axially slidably journaled, and forming an annular tubular or cylindrical space 50 axially between the bearings 46 and 48 around the outer extension length 22, and includes an outer-end annular flange 52 of substantially less outer diameter than the inner diameter of the housing or cylinder 30, as by the distance of a gap 53. The sleeve 44 also has, in this case, an annular outer groove 54.

A closed or solid ring 56 renders the sleeve 44 a piston, or acts as a piston head, with the sleeve corresponding to a piston rod, and the ring 56 closely slidably fitting the cylinder or housing 30, radially spaced, as by a substantial distance 58, outwardly from the sleeve 44 about the latter.

Spring means 60 surrounds the extension 16 and the sleeve 44 under compression between the closed ring 56 and the shim means 28 for controlling valve actions of the sleeve or valve element 44, and holding the closed ring 56 at one end in fluid-tight relation to the flange 52. In this instance, a snap ring 62 mounted in the groove 54, is adapted to axially hold the closed ring 56 at its other end in case of binding of the ring 56 in the bore of the cylinder 30 while the ring 56 is moving from left to right, as viewed in Figure 1. The clearance 58 permits the ring 56 to assume any required radial position within limits. One of the wall and sleeve elements 36 and 44, respectively, in this case the latter, has axially extending means or lugs 64 limiting movement of the piston or valve sleeve 44 toward the wall 36.

The replaceable shims 28 are placed between the spring 60 and the body 12 to permit accurate pressure adjustment before final assembly, and to compensate for small variations in spring characteristics during production.

Leakage between the piston ring 56 and the piston flange 52 is prevented by virtue of the fact that the adjacent end face of the ring is always held in close contact with the flange by the spring 60 and the fluid pressure.

In ordinary constructions, extreme accuracy would be required in holding concentricity of the two valve guide diameters 66 and 68 and the inner and outer piston diameters, and the fit of the valve guide 16 in the housing 30.

In operation:

With the parts in the positions shown, fluid from the left, or upstream, side of the device enters the inlet end 14 and passes through the ports 24, the cylindrical space 50 and the ports 26 to the system to the right of the outlet end 34.

When the pressure in the system rises to a value determined by the setting of the spring 60, the sleeve valve, of which the piston 56 is a part, will move to the left by pressure in the gap 38 against the action of the spring 60 to gradually constrict the areas of the ports 26 until the pressure in the outlet 34 decreases sufficiently to stop or cause reverse movement of the piston.

By selecting the force and rate value of the spring 60, the pressure in the system represented by the pressure in the gap 38 opposite the counterbore 40 is limited to a predetermined value.

Figure 2:
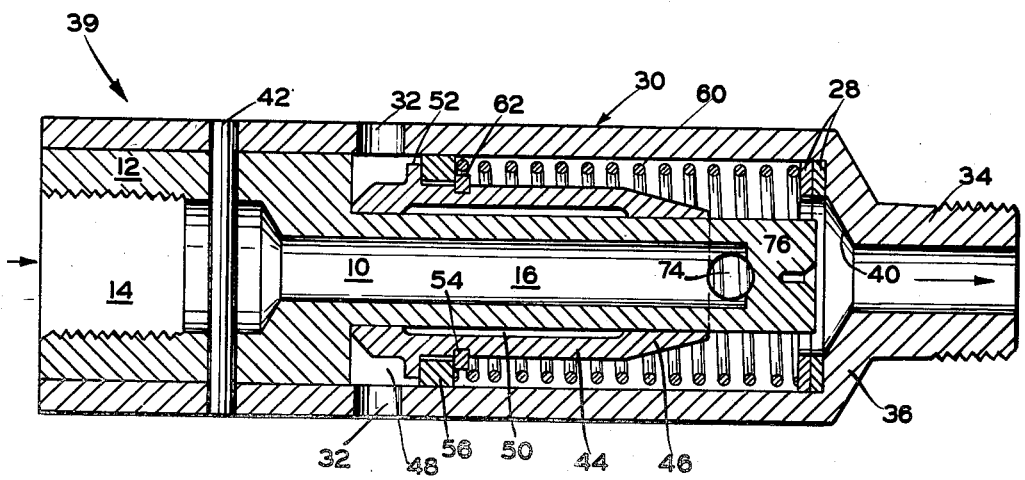
Figure 2 is a similar view of a sub-atmospheric or suction regulating valve constituting a modification of the invention.

In Figure 2, a suction valve 39 constituting a modification of the device of Figure 1, is similar thereto with certain exceptions, such as that wherein the extension 16 has only one port or set of ports 74 and a partition 76 at the free end thereof. The shims 28 are against the wall 36 instead of the body 12, and the sleeve 44 extends in reverse direction. The shoulder 18 of Figure 1, which is adapted to limit movement of the sleeve 44 to the left in that figure under super fluid pressure, is omitted in Figure 2, since the sleeve 44, in the latter figure, is urged to the left against the body 12 under pressure of the spring 60.

In each form, the closed ring 56 is mountable over one end of the sleeve 44 to position beyond the groove 54 from such end against the flange 52.

The operation is similar, but reverse, in that suction from the right of the device through the ports 74, as indicated by Figure 2, draws the piston, made up of the sleeve 44 and the ring 56, to the right against the spring 60 to throttle the ports 74 and stabilize the system at a preselected value.

Figure 3:
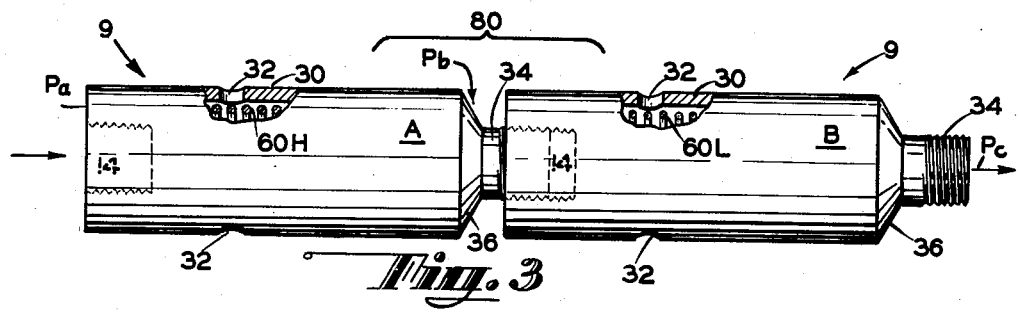
Figure 3 is a diagram of a plurality of the valves of Figure 1 coupled in series or tandem to make up the aforesaid multi-stage unit.

Figure 3 indicates two of the valves of Figure 1 adapted as series connected components of a multi-stage unit 80 where extreme accuracy is desired over a large inlet pressure range, with one of the components designated as A and the other as B.

The first stage component A has a heavy spring 60H and effects large step regulation of pressures higher than the desired ultimate regulation effected by the second stage component B, which has a light spring 60L. The first stage A thus may be designated as a "buffer" stage for the second stage B, and the latter classified as a "vernier" adjuster relative to the stage A in obtaining the final result.

The unit 80 operates such that a pressure $Pa$ at the inlet end of A may vary as from 3 to 90 pounds per square inch gage, with the spring 60H set to regulate $Pb$ to 5 p. s. i. g.±2. The spring 60L may be set to hold $Pc$ to 2.0±0.1 in Hg. gage, with one turn-and-bank indicator alone, or two turn-and-bank indicators connected in parallel.

Although only three embodiments of the invention have been illustrated and described, various changes in the form and relative arrangements of the parts may be made to suit requirements.

What is claimed is:

1. A valve comprising, in combination, a tubular guide including an inlet body end and an opposite-end tubular extension of less diameter than the body and formed integral therewith, said tubular extension having axially offset side ports and a partition between the ports, annular shim means surrounding the extension next to the body, a vented tubular housing forming a cylinder and telescoping the body, a pin fastening the body in said housing, said housing including a system-outlet end having a wall element transversely of the guide spaced axially beyond said outer extension length and having a tapered outwardly converging counterbore, a valve sleeve element comprising axially-spaced bearings axially slidably journaled on said extension, and forming a space between the bearings, around said outer-extension length and including a radially-outer annular flange of substantially less outer diameter than the inner diameter of the cylinder and an annular outer groove, a closed ring rendering the sleeve a piston and closely slidably fitting the cylinder radially spaced outwardly substantially from the sleeve about the latter, spring means surrounding the extension and the sleeve under compression between said closed ring and the shim means holding the closed ring at one end against the flange, and a snap ring in the groove adapted to axially hold the closed ring at its other end, one of said elements having axially extending means engageable with the other of said elements for limiting movement of the sleeve toward the wall to thereby define a pressure chamber between the end of said sleeve and said wall, and said valve sleeve element cooperating with at least one of said offset side ports for regulating the same in response to the fluid pressure at said outlet end.

2. In combination, a tubular valve guide including an inlet body end and an outlet end extension of less diameter than the body having a partition and side ports at opposite sides of the partition, a vented tubular housing telescoping the body and forming a cylinder, means securing the body in said housing, said housing having a lateral outlet-end wall, a valve sleeve comprising axially spaced bearings adapted to throttle said ports and slidably journaled on said extension, and forming a space between the bearings to regulate flow from said inlet to said outlet, said bearings communicating with said side ports around the guide and including a radially outer annular flange of substantially less diameter than the inner diameter of the cylinder and an annular outer groove spaced axially from the flange, a closed ring closely slidably fitting the cylinder radially outwardly spaced substantially from the sleeve about the latter with one end next to the flange, a snap ring in the groove adapted to axially hold the closed ring at its other end, carried by said sleeve for limiting movement of the piston toward the wall to thereby define a pressure chamber between the end of the sleeve and the wall, and spring means surrounding the extension under compression between the body and the valve opposing the movement of said valve tending to throttle said side ports, the arrangement providing for the reception of spring-adjusting shim means at one end of the spring.

3. In combination, a tubular valve guide comprising a body including an inlet end and an outlet end extension of less diameter than the body having a partition and side ports at opposite sides of the partition, a vented tubular cylinder housing telescoping the body, means securing the body in said housing, said housing having a lateral outlet-end wall, a valve sleeve comprising axially spaced bearings adapted to throttle said ports to regulate flow from said inlet to said outlet, said bearings slidably journaled on said extension, and forming a space between the bearings communicated with said side ports around the guide and including a radially outer annular flange of substantially less diameter than the inner diameter of the cylinder and an annular outer groove spaced axially from the flange, a closed ring closely slidably fitting the cylinder radially outwardly spaced substantially from the sleeve about the latter and having one end next to the flange, a snap ring in the groove adapted to axially hold the closed ring at its other end, means operable between the end of said sleeve and said wall for limiting movement of the piston toward the wall to thereby provide a pressure chamber between the end of the sleeve and said wall, spring means surrounding the extension under compression between the body and the valve opposing the movement of said valve tending to throttle said ports, and means for adjusting the spring compression and thereby the setting of said regulating valve.

4. In combination, a tubular valve guide comprising a body including a fluid inlet end and a fluid outlet end extension of less diameter than the body having a partition and side ports at opposite sides of the partition, a vented tubular housing forming a cylinder telescoping the body, means securing the body in said housing, said housing having a lateral outlet-end wall, a valve sleeve comprising axially spaced bearings adapted to throttle said side ports to regulate flow from said inlet to said outlet, said bearings slidably journaled on said extension, and forming a space between the bearings communicating with said side ports around the extension and including a radially outer annular flange of substantially less diameter than the inner diameter of the cylinder and an annular outer groove spaced axially from the flange, a closed ring closely slidably fitted in the cylinder radially outwardly spaced substantially from the sleeve about the latter with one end of the ring next to the flange, a snap ring in the groove adapted to axially hold the closed ring at its other end, means carried by said sleeve for limiting movement of the piston toward the wall to thereby provide a pressure chamber between the end of said sleeve and said wall, and spring means under compression between the body and the valve and biasing the valve in opposition to the fluid pressure at the outlet end so as to regulate said side ports to offset a predetermined outlet fluid pressure.

5. In combination in a valve, a structure including a housing forming a cylinder and having inlet and outlet means and a port to atmosphere, a tubular guide having a bore, said tubular guide positioned between the inlet and the outlet in the cylinder and having a partition across the guide bore and side-wall port means, a sleeve valve slidable on the guide between positions varying the flow through the port means and comprising a radially extending outer annular flange positioned in spaced relation to the inner surface of the cylinder, a closed ring closely slidably fitting the inner cylinder surface but radially outwardly spaced from the sleeve within the outer perimeter of the flange about the sleeve, said cylinder port to atmosphere opening at one side of said closed ring, and piston means responsive to the atmospheric and outlet pressures to move said sleeve valve along said guide in regulating said port means including spring means biasing the closed ring against the flange.

6. In a fluid-pressure regulating unit, the combination comprising a tubular guide having a bore, said tubular guide including a partition across its bore and side-wall port means, a tubular housing forming a cylinder and enclosing the guide, said tubular housing having inlet and outlet means and a port to atmosphere, a valve sleeve slidably mounted on the guide thereabout adapted to vary the flow through the port means and including a radially extending outer annular flange positioned in spaced relation to the inner surface of the cylinder and an annular outer groove, a closed ring rendering the sleeve a piston and closely slidably fitting the cylinder radially spaced outwardly from the sleeve about the latter, said cylinder port to atmosphere opening at one side of said closed ring, said valve sleeve piston movable along said guide in response to the atmospheric and outlet pressures to regulate said port means, spring means for biasing said valve sleeve piston in opposition to one of said pressures and holding the closed ring at one side against the flange, a snap ring in the groove at the other side of the closed ring adapted to hold the latter axially.

7. In combination, a structure including a housing forming a cylinder having fluid pressure inlet and outlet means and a port to atmosphere, a guide having fluid port means opening from said inlet to said outlet means, a piston sleeve slidable on the guide in response to the atmospheric and outlet pressures to regulate said port means and comprising an outer annular groove and a radially outer flange positioned in spaced relation to the inner surface of the cylinder, a closed ring having one side next to the flange and closely slidably fitting the inner cylinder surface but radially outwardly spaced from the sleeve within the outer perimeter of the flange about the sleeve, a snap ring in the groove at the opposite side of the closed ring, said port to atmosphere supplying atmospheric pressure to a side of said closed ring, said outlet fluid pressure means opening to the opposite side of said closed ring, and means including a spring acting against the closed ring to hold the latter against the flange and prevent leakage between the flange and the closed ring while effecting movement of the sleeve along the guide in opposition to the pressure at one side of said closed ring for regulating the port means.

8. In combination, a structure including a housing forming a cylinder having fluid pressure inlet and outlet means and a port to atmosphere, a guide having a fluid outlet port opening from said inlet to said outlet means, a piston sleeve slidable on the guide in response to the atmospheric and outlet pressures to regulate the fluid outlet port and comprising a radially extending outer annular flange positioned in spaced relation to the inner surface of the cylinder, a closed ring having one side next to the flange and closely slidably fitting the inner cylinder surface but radially outwardly spaced from the sleeve within the outer perimeter of the flange about the sleeve, said port to atmosphere supplying atmospheric pressure to a side of said closed ring, said outlet means opening at the opposite side of said closed ring, means on the sleeve adapted to axially hold the ring at the opposite side of the ring, and means including a spring acting against the closed ring to hold the latter against the flange while moving the sleeve in opposition to the pressure at one side of said closed ring along the guide in regulating the fluid outlet port.

9. In combination, a structure including a housing forming a cylinder having fluid pressure inlet and outlet means and a port to another fluid pressure, a guide having a fluid port means opening from said inlet to said outlet means, a piston sleeve slidable on the guide in response to said outlet and other fluid pressures to regulate said port means and comprising a radially outer annular flange positioned in spaced relation to the inner surface of the cylinder, a closed ring having one side next to the flange and closely slidably fitting the inner cylinder surface but radially outwardly spaced from the sleeve within the outer perimeter of the flange about the sleeve, said outlet means supplying outlet fluid pressure to a side of the closed ring, said housing port supplying said other fluid pressure to the opposite side of said closed ring, and means including a spring to actuate said sleeve in response to said outlet and other fluid pressures for regulating said port means and said spring biasing the closed ring in a sense to hold the latter against the flange.

10. In combination in a valve, a structure including a housing forming a cylinder having fluid pressure inlet and outlet means and a port to another fluid pressure, a valve guide portion in the cylinder having a fluid port means opening from said inlet to said outlet means, a piston sleeve valve member on the guide to regulate the fluid port means in response to said outlet and other fluid pressures and comprising a radially outer annular flange positioned in spaced relation to the inner surface of the cylinder, a closed ring closely slidably fitting the inner cylinder surface but radially outwardly spaced from the valve member within the outer perimeter of the flange about the valve member, said outlet means supplying outlet fluid pressure to a side of the closed ring, said housing port supplying said other fluid pressure to the opposite side of said closed ring, and means including a spring for biasing said valve member in opposition to one of the fluid pressures applied at opposite sides of the closed ring for regulating said port means and holding the closed ring in fluid-tight relation to the flange.

11. A regulating valve comprising a housing forming a cylinder, an end wall closing one end of said housing and including a fluid pressure outlet, a guide having a body portion fixedly mounted in and closing the other end of said housing, an extension formed on said body portion and extending into said cylinder, said extension being of lesser diameter than the inner diameter of said cylinder and terminating short of said end wall, a fluid pressure inlet formed in said body portion, a bore formed in said extension communicating with said inlet, port means opening from said bore to said outlet, a valve sleeve having axially disposed bearings slidably mounted on said extension, one of said bearings being constructed and arranged to throttle the port means upon the movement of said valve sleeve relative to said extension, a piston head formed on one end of said valve sleeve, said piston head including a peripheral flange formed on said valve sleeve and of lesser diameter than the inner diameter of said cylinder, a closed ring closely slidably fitting said cylinder and constructed and arranged for engagement with said flange, spring means surrounding said extension and valve sleeve and mounted within said cylinder and operative to bias said closed ring against said peripheral flange and through said closed ring said valve sleeve in one direction, a port in said cylinder opening to atmosphere and subjecting one side of said piston head to atmospheric fluid pressure, the opposite side of said piston head being subjected to the fluid pressure at said outlet, whereby one of said last mentioned fluid pressures may effect movement of said valve sleeve against the bias of said spring means to thereby throttle said port means as aforesaid.

WALTER D. TEAGUE, Jr.

REFERENCES CITED

The following references are of record in the file of this patent:

UNITED STATES PATENTS

| Number | Name | Date |
|---|---|---|
| 444,082 | Abbe | Jan. 6, 1891 |
| 970,225 | Holden | Sept. 13, 1910 |
| 1,731,519 | Bastian | Oct. 15, 1929 |
| 1,900,514 | McLean | Mar. 7, 1933 |
| 1,986,480 | Mahle | Jan. 1, 1935 |
| 2,060,847 | Bowen | Nov. 17, 1936 |
| 2,410,480 | Davis | Nov. 5, 1946 |